(12) United States Patent
Chen et al.

(10) Patent No.: US 9,210,476 B1
(45) Date of Patent: Dec. 8, 2015

(54) METHODS AND APPARATUS FOR DELIVERING APPLICATION DATA TO APPLICATIONS

(75) Inventors: David W. Chen, Ashburn, VA (US);
Vipul Babubhai Patel, Great Falls, VA (US); Mehul Shah, Ashburn, VA (US); Jian Yu, Ashburn, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 495 days.

(21) Appl. No.: 13/485,822

(22) Filed: May 31, 2012

(51) Int. Cl.
*H04N 21/488* (2011.01)
*H04N 7/16* (2011.01)

(52) U.S. Cl.
CPC .................................. *H04N 21/488* (2013.01)

(58) Field of Classification Search
CPC ... H04N 21/47; H04N 21/488; H04N 21/442; H04N 21/443
See application file for complete search history.

(56) References Cited

U.S. PATENT DOCUMENTS

| | | | |
|---|---|---|---|
| 2007/0022434 A1* | 1/2007 | Oh ................................. | 725/32 |
| 2008/0235749 A1* | 9/2008 | Jain et al. ...................... | 725/114 |
| 2009/0138934 A1* | 5/2009 | Aoki et al. .................... | 725/131 |
| 2010/0192175 A1* | 7/2010 | Bachet et al. .................. | 725/31 |
| 2014/0101687 A1* | 4/2014 | DeCenzo et al. .............. | 725/14 |

* cited by examiner

*Primary Examiner* — Jason Salce
*Assistant Examiner* — Omar S Parra
(74) *Attorney, Agent, or Firm* — Straub & Pokotylo; Michael P. Straub; Abbas Zaidi

(57) ABSTRACT

Methods and apparatus for supplying unbound applications with data via in-band program channel signaling are described. Unbound applications are STB or other customer premise device applications which continue to run when a tuner in the device changes between program channels. Applications executed in a STB, in accordance with the present invention, e.g., eBIF applications, continue to run despite changes in program channels with data being supplied via in-band signaling, out of band signaling, or a combination of in-band and out of band signaling. The methods and apparatus are well suited for supporting delivery of program catalog information relevant to an individual program channel using in-band signaling reducing or eliminating the need to delivery a multi-channel program catalog via out of band signaling to support various VOD applications.

20 Claims, 10 Drawing Sheets

METHODS AND APPARATUS FOR DELIVERING APPLICATION DATA TO APPLICATIONS

FIELD OF THE INVENTION

The present invention relates to methods and apparatus which support delivery of application data to various applications, e.g., unbound applications running on a customer premise device, through bound, e.g., in-band, channels.

BACKGROUND OF THE INVENTION

Some applications are classified into two categories, that is, bound applications and unbound applications. The bound and unbound applications normally run on a set top box and/or other customer premise equipment (CPE) device that also executes an operating system which enables the device to operate and execute other applications such as bound and unbound applications which can provide features and/or functions to a user or device external to the device executing the bound or unbound application.

A bound application is an application that downloaded and/or executed by tuning to a video channel. A bound application uses resources and data that are obtained, e.g., loaded from the channel the device implementing the bound application is tuned to. Such data is sometimes called in-band data since it is obtained from same channel, and thus frequency band, used to provide video and/or other content which is output by the CPE device. In the case of bound applications the application is normally downloaded and executed on a customer device, e.g., such as a set top box (STB) when it tunes to the channel. A bound application is terminated, and thus destroyed, when the customer premise device tunes out of the channel from which the data was obtained, e.g., when a channel is changed and the STB tunes to a different frequency band corresponding to another channel.

An unbound application is an application that can run and continue to run even if the channel to which the device executing the unbound application is changed, e.g., even if a STB tunes to a different channel the application will not terminate as a result of the changing of the channel to which the STB is tuned. Since the execution of the unbound application is not tied to the device being tuned to a particular channel, the application is considered not to be "bound" to a particular channel and hence the name unbound application. Traditionally unbound applications get data used by the unbound application from Out-Of-Band (OOB) channels. Examples of unbound applications include applications such as StartOver and LookBack application from Time Warner Cable which are based on catalog data which provides information about a program or program portion, which has been or is being broadcast. The catalog data provides sufficient information to the set top box to allow the set top box to identify a program for which the service is to be provided and also where within the program streaming should commence or jump to under control of a user.

StartOver is a Time Warner Cable application which allows a user to begin watching a broadcast program from the beginning after at least a portion of the program has been broadcast. A StartOver application, when executed on a STB, allows viewers to start and view a currently watched program over from the beginning of the program. LookBack is another Time Warner Cable application. LookBack application allows viewers to request and view programs that were broadcast on the same channel earlier on demand. Such application are often implemented as switched digital video services where the content corresponding to a program is streamed in response to a user request to the STB or other CPE device corresponding to the user using the StartOver or LookBack application.

Some unbound applications such as StartOver and Look-Back rely on catalog data sent from a server to determine titles available for viewing. Traditionally catalog data corresponding to a plurality of channels are bundled together and sent Out-Of-Band (OOB), e.g., through an OOB channel, to STBs.

As discussed above, traditionally unbound applications such as StartOver and LookBack get the application data from Out-Of-Band (OOB) channels. Since StartOver/LookBack catalog data and/or other application data corresponding to different channels is usually bundled together and delivered out of band, i.e., through an OOB channel, the amount of data that is delivered OOB can be considerable larger than the amount of data needed to support such services for an individual channel.

One disadvantage with this approach of providing content corresponding to multiple channels together as a bundle using OOB signaling is that for some devices such as older set top boxes, OOB bandwidth is often very limited. This makes OOB delivery either impossible or expensive for at least some devices in that other services or features may have to be restricted or avoided if the OOB bandwidth to supply catalog and/or other data corresponding to multiple channels. Furthermore, downloading and processing catalog data corresponding to a large number of channels and/or programs to STB and processing can also be CPU and memory intensive, particularly for some of the STBs such as legacy STB devices which have limited memory and processing capabilities.

In view of the above discussion, it should be appreciated that it would be desirable if methods and/or apparatus could be developed which would allow delivery of unbound application data, e.g., catalog data and/or other unbound application data, to the customer devices through inbound delivery methods, e.g., through an inbound channel to which a customer device such as STB is tuned to. Such an approach would allow avoiding the use of scarce OOB bandwidth as well as use of STB memory and CPU processing power.

SUMMARY OF THE INVENTION

Methods and apparatus for delivering data to unbound applications executed on customer premise devices, e.g., set to boxes (STBs), and implementing unbound applications are described. In accordance with various features of the present invention data is delivered to unbound applications using in-band signaling. Thus, at least in some embodiments an application which will continue to run uninterrupted as a user switches between channels is supplied with data that is used by the application by way of the channel a user is tuned to at a particular time.

In some but not necessarily all embodiments, the unbound applications of the present invention which use in-band data are EBIF applications which are initially loaded onto a set top box using in-band program channel communication to load the EBIF application. At least some such EBIF applications continue to run, e.g., in an uninterrupted manner, in accordance with the invention after the STB is switched to another program channel.

In some embodiments the data communicated in-band on a channel provides information that is specific to the channel and/or programs being supplied on the particular program channel. For example, program catalog information may be supplied for the particular channel used to communicate the program catalog information via in-band signaling but not for other program channels. Thus, the data being communicated in-band on a channel can be kept to reasonable amounts. By communicating catalog and/or other data in-band to an unbound application, the amount of data which is communicated out of band can be reduced as compared to embodiments which rely extensively to communicate program catalogs and/or other information corresponding to multiple channels as part of large multi-channel program catalogs which are sent out of band.

The methods and apparatus of the present invention are well suited for a wide variety of applications. Exemplary applications include LookBack and StartOver application where catalog information received in-band can be used to initiate a VOD operation related to view of content which was previously delivered on the channel to which the customer premise device, e.g., STB, is tuned.

The methods of the present invention can also be used to support reporting of customer premise device tuning information. For example an in-band data request message can be sent which is used to trigger a response from a STB. A data collection application which runs regardless of what channel the STB is tuned to may respond to the in-band message by sending a signal indicating that it received the message that was sent in-band. The response may, optionally, indicate the amount of time the STB has remained tuned to the channel on which the data request message was sent and, optionally identify the program channel. Even without the duration and channel identification information the device sending the in-band data request message can determine the number of STBs tuned to the channel on which the data collection message was sent from the number of responses which are received.

Applications implemented in accordance with some features can use a combination of in-band supplied data and out of band supplied data. For example a display application can use ticker data and/or logo data received via in-band program channel communication to generate ticker and/or logos which are output as output in combination with received program content. The same application can also display call notification message with caller ID information that is supplied to the application via out of band signaling. Such out of band signaling is particularly useful since the information is intended for a particular set top box or household and broadcasting it to multiple households in-band might be wasteful of in-band resources.

It should be appreciated that the functionality and/or output of unbound application in accordance with the invention can change depending on the in-band data, out of band data and/or user input that is received. While in-band data and out of band data is discussed generally, it should be understood that the in-band information and/or out of band information or data can include control information, commands and/or exactable code with can be used as an input or data supplied to an application to change the applications functionality or to enable the application to perform a function.

Various additional features and advantages of the present invention are discussed in the detailed description which follows.

DETAILED DESCRIPTION

Figure 1:
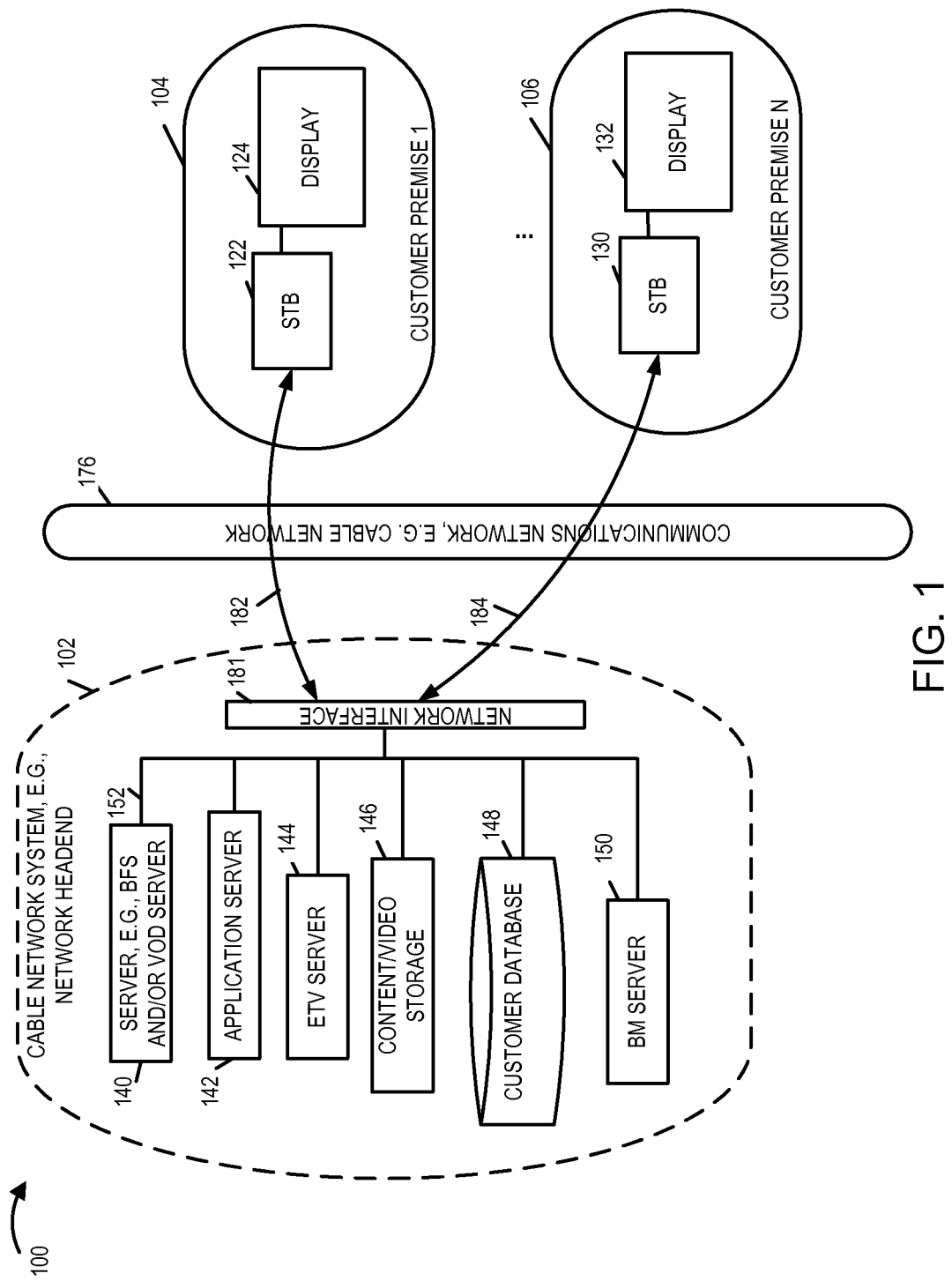
FIG. 1 illustrates an exemplary system implemented in accordance with some embodiments of the present invention.

FIG. 1 illustrates a system 100 implemented in accordance with some exemplary embodiments of the present invention. The system 100 supports content delivery, e.g., video and audio content and/or other application data delivery, to customer devices, e.g., content playback devices. The content playback devices may, and in some embodiments do include set top boxes, internes capable TVs, computers, mobile cellular phones with internet capability, etc. Thus, mobile as well as fixed content playback devices are supported in at least some embodiments.

The system 100 includes a service provider system 102, e.g., cable network headend, and a plurality of customer premises 104, 106. In the discussion, service provider system 102 is also referred to as the headend 102.

The service provider system/headend 102 may be implemented at an internes service provider's office or site including multiple servers and databases which are coupled together. In the FIG. 1 example, the headend 102 includes a server, e.g., broadcast file server (BFS) and/or video-on0demand (VOD) server 140, an application server 142, an ETV server 144, content video storage system 146, customer database 148, and a business management server 146. It should be appreciated that one or more of the various servers and/or elements shown to be included in the headend 102, in some embodiments, reside outside the headend 102. In some embodiments one or more of the servers and/or elements is implemented in a distributed manner, with portions of the server or element residing at different locations in system 100. The various servers and other components included in the headend 102 are coupled together by a local network 152. The local network 152 is coupled via one or more network interfaces 181 to other networks and/or devices. For example, the headend 102 is coupled via network interface 181 to service provider's communications network 176, e.g., a cable network, and may also be coupled to one or more other external networks.

Via the communications network 176, the devices in the network headend 102 can send and receive signaling and/or other information to the devices located at the customer premises 104, 106 coupled to the cable network 176. Each customer premise 104, 106 includes a set top box 122, 130 and a display device 124, 132 respectively. The display device could be, e.g., an external television. It should be appreciated that each of the STBs 122, 130 can be integrated in a device which also includes a display. The STBs support video and, optionally, E-mail functionality. The STBs 122, 130 can be used to send information to the headend 102 in addition to receiving signaling and/or information from the headend 102. In addition, in some embodiments each customer premise 104, 106 may include one or more IP devices in addition to the STBs. In various embodiments, the IP devices are devices that support internet protocol, such as a personal computer (PC), laptop, cell phone, etc. In various embodiments the IP devices support web browsing functionality and other features useful in, e.g., viewing multimedia content online, e.g., over the internet. The STBs 122, 130 may, and often do, include DVR functionality and the storage of user selected content. Although not shown, customer premise 104, 106 may also include additional STBs and display devices. In some embodiments the STBs 122, 130 include a built in modem.

As shown in FIG. 1, communications link 182 traversing the service provider's cable network 176 couples STB 122 to the network head end 102's network interface 181. Similarly, STB 130 in the customer premise n 106 is coupled to service provider's system 102's network interface 181 via link 184 which traverses the service provider's network 176.

The BFS and/or VOD server 140, among other things, is responsible for delivering programming content and/or other information to one or more customer STB devices, e.g., including STB 122 and STB 130. Exemplary delivered programming content includes video on-demand content ordered by one or more customers to the customer devices, e.g., to STB 122 and/or other customer devices. In some embodiments a BFS server and a VOD server are implemented as separate individual servers.

Application server 142 generates and provides application data, e.g., such as catalog data and/or other application specific data corresponding to various applications supported by the headend 102, to customer premise devices such as STBs. The ETV server 144 generates and provides eBIF application data corresponding to eBIF applications through ETV PIDs included in a program. In some embodiments the application data generated by the STB server 144 is multiplexed to an audio and/or video program through a multiplexer, e.g., an MPEG-2 transport multiplexer.

The customer database 144 includes customer information corresponding to a plurality of customers including customer account information, customer subscription information, and information regarding the devices installed at customer premises. In some embodiments customer account information includes, e.g., customer account number, customer subscription/service information, and other billing related information. Customer device information includes device identification and/or other information regarding customer devices such as STBs, modems etc., installed at various customer premises served by the headend 102.

BM (Business management) server 150 processes billing information corresponding to customers serviced by the network headend 102. This may include updating billing charge information in response to changes in services being provided to the customer, upgrades, new purchases, and/or other activity. Business management server 146 also processes services bill payment information, e.g., bill payment transactions, deductions from debit accounts, mail bills, and/or processes discount and/or other information.

In accordance with one aspect of the invention application data for an unbound application generated by the application server 142 and/or ETV application data generated by an ETV server 144 is provided to a customer device, e.g., a set top box, though an in-band (IB) channel, e.g., a channel to which the STB is currently tuned to.

Figure 2:
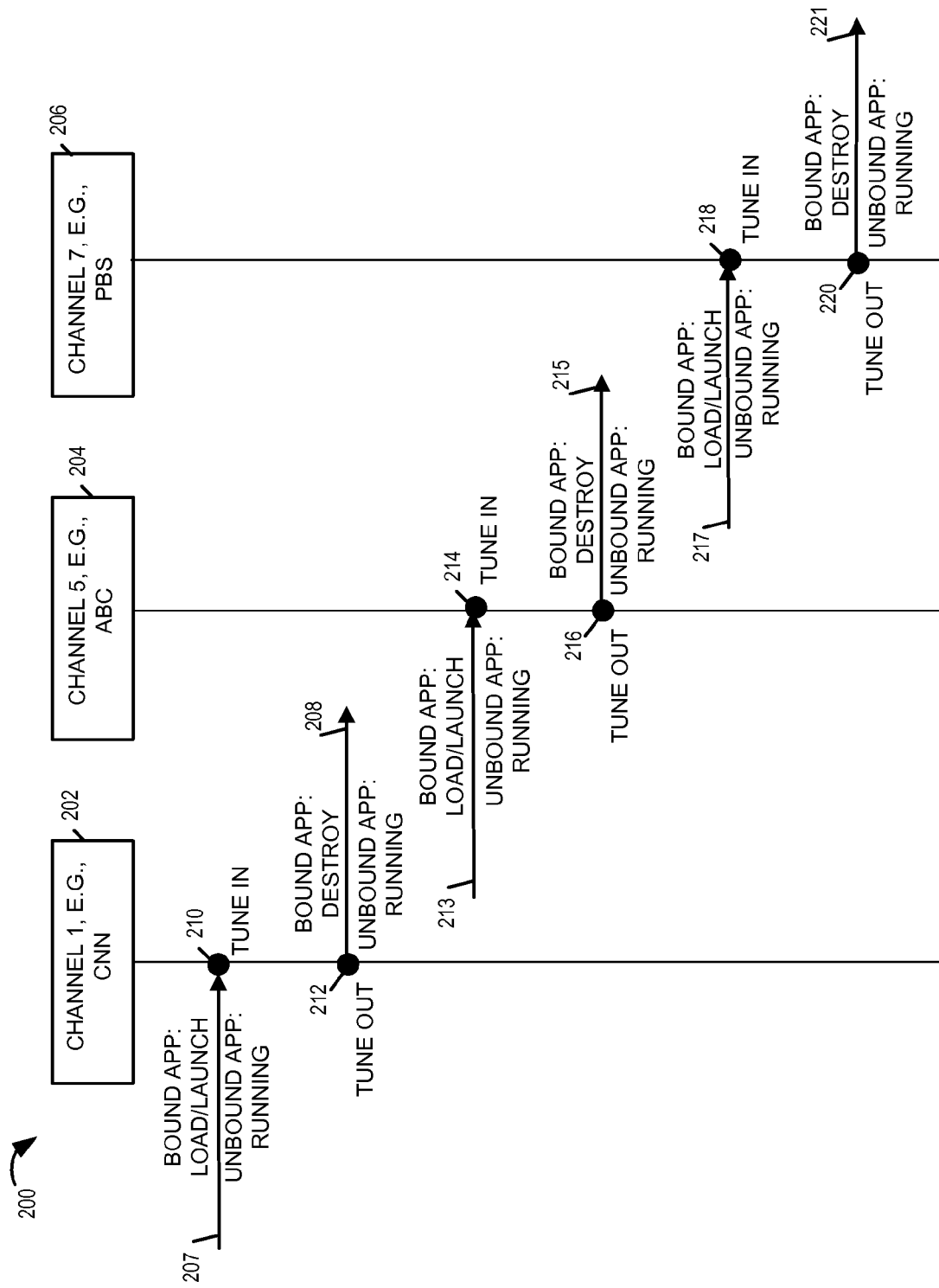
FIG. 2 is a drawing illustrating application life cycle during channel tuning for bound and unbound applications.

FIG. 2 is a drawing 200 illustrating application life cycle during channel tuning for bound and unbound applications. A bound application is downloaded and executed on the STB device when a customer device, e.g., STB, tunes to a program channel. The bound application resources and data are also loaded through the channel to which the STB device is tuned. The bound application is terminated and destroyed when the STB is tuned out of the channel, e.g., due to a program channel change. On the other hand an unbound application can run and execute on any channel once it is loaded to the STB, and the unbound application can get the application resources and data from out of band channels and in-band channels, e.g., in-band channel to which STB is tuned to at a given time. The unbound application may be initially downloaded to the STB through out of band signaling, or could be pre-loaded on the STB.

As illustrated in FIG. 2, in step 210 an STB is tuned in to channel 1, e.g., CNN channel. When the STB is tuned to the CNN channel, a bound application corresponding to the CNN channel is loaded/launched, while an unbound application is running as indicated above and below the arrow 207 in FIG. 2. The unbound application can run on any channel, and in accordance with one aspect of the invention, the application data for the unbound application that is relevant and unique to a given channel to which the STB is tuned to, is provided to the STB through the in-band channel, i.e., the channel to which the STB is tuned to at the given time. For example, in step 210 when STB is tuned to CNN channel, it only gets the unbound application data for unbound application, e.g., StartOver/LookBack catalog data, of CNN programs, but not other unrelated program from ABC, NBC etc. Thus it should be appreciated that this approach avoids exhausting a large amount of STB memory for storing unrelated unbound applications data and use of scarce out of band bandwidth.

In step 212 the customer device tunes out of CNN channel, this causes the bound application to terminate/destroy while the unbound application continues to run as indicated above and below the arrow 208. Thus it should be appreciated that unlike bound applications, unbound application does not have to load, unload and then reload when tuning to different channels. A running unbound application does not terminate or destroy when the STB is tuned out of a channel.

In step 214 the STB device tunes to channel 5, e.g., ABC channel. When the STB is tuned to the ABC channel, a bound application corresponding to the ABC channel is loaded/launched, while an unbound application is running as indicated above and below the arrow 207 in FIG. 2. Again, in accordance with the invention, the unbound application data for the unbound application that is relevant and unique to channel ABC to which the STB is tuned to, is provided to the STB through the ABC channel. Thus through ABC channel the STB only gets the unbound application data, e.g., StartOver/LookBack catalog data, for ABC programs, but not other unrelated program from CNN, NBC etc. The catalog data includes, e.g., Program title, program description, program ratings etc.

In step 216 the customer device tunes out of ABC channel, this causes the bound application to terminate/destroy while the unbound application continues to run as indicated above and below the arrow 215. Similar process is illustrated in steps 218 and 220 when the STB respectively tunes in and out of the NBC channel.

Figure 3:
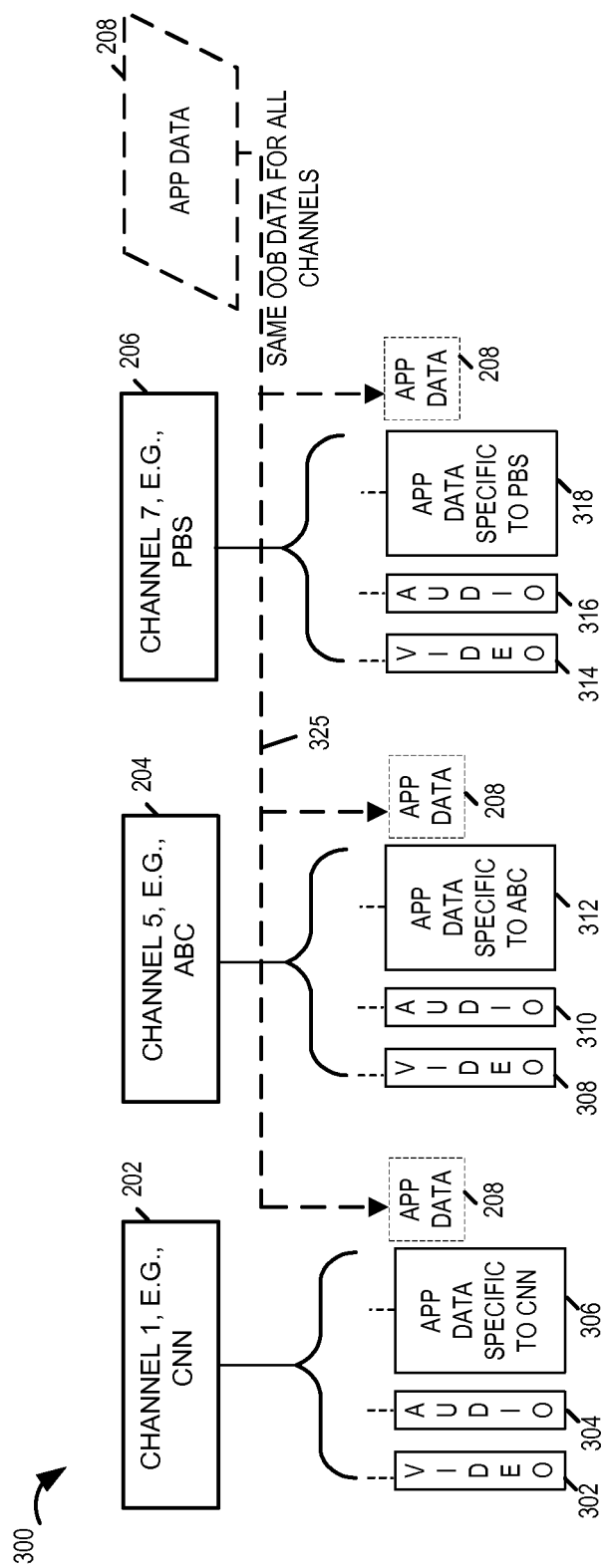
FIG. 3 is drawing illustrating the delivery of data, e.g., application data and/or other data, to unbound applications through in-band channels and through out of band channels, in accordance with some embodiments.

FIG. 3 is drawing 300 illustrating the delivery of data, e.g., application data and/or other data, to unbound applications through in-band channel and through out of band channels, in accordance with some embodiments. In accordance with one aspect of the invention, data is provided to various applications supporting various exemplary functions, by a combination of in-band and out of band channel signaling.

FIG. 3 shows an out of band channel represented in the example by dashed line 325, through which unbound application data shown as APP DATA 208 may, and in some embodiments is, delivered. In some embodiments the out of band data includes incoming call data delivered to a customer premise device, e.g., STB, to support an incoming call notification application. As illustrated, in accordance with various embodiments of the invention, the customer devices, e.g., STBs, receive unbound application data specific to the particular channel the STB is tuned to at a given time, through that channel. Thus, an STB tuned to CNN will receive unbound application data specific to CNN 306, in addition to the video and audio content 302, 304 via the channel/frequency band corresponding to CNN channel 202. Similarly, an STB tuned to ABC will receive unbound application data specific to ABC 312, in addition to the video and audio content 308, 310 via the channel/frequency band corresponding to ABC channel 204. The same concept is illustrated further where an STB tuned to PBS receives unbound application data specific to PBS 318, in addition to the video and audio content 314, 316 via the channel/frequency band corresponding to PBC channel 206.

Unbound applications include, for example, StartOver and LookBack application, usage data collection applications used to collect data regarding usage of channels, etc. Unbound application data includes e.g., StartOver/LookBack catalog data, control data and/or channel specific catalog data.

Although StartOver/LookBack is used as an example for unbound applications while illustrating delivering of application data to unbound applications through in-band channel, various features of the present invention can be used for other applications too. For example, the features of the present invention are used in some embodiments for Usage data collection. In some such embodiments a server sends a message through an IB channel to STBs. Only the STBs that are tuned to the channel at the time can receive the message and respond to it. This message-response mechanism can be, and in some embodiments is, used to measure who and how many STBs are tuned to the given channel.

Similarly, the features of the present invention can be applied to perform various other functions. For example, same unbound app performs different tasks on different channels. By delivering different types of application data/message through different IB channels, the behavior of the unbound application can be changed depending on different types of application data/messages on different IB channels the STB is tuned to. Consider an example where on one channel, an unbound application can receive application data/message with type "ticker". Using the received application data/message the app will display a scroll ticker, e.g., on the bottom of screen. The same application on a second channel can receive a different type of application data/message, e.g., "logo". Using this application data on the second channel the app will display the channel logo, e.g., on top left corner of screen. Thus it should be appreciated that the same unbound application can be controlled to perform different tasks when it runs on different channels by sending different types of specific application data/messages on the IB channel.

In another embodiment, an unbound app is triggered by both OOB and IB data. An unbound application can get data from both OOB and IB channel. For example, in one implementation it is desired to receive a Caller ID data no matter which channel the STB is tuned to, but only receive channel specific data when it is tuned to a channel. The unbound application can receive the Caller ID whatever channel it is tuned to, but only receives channel specific unbound application data, e.g., catalog data, when it is tuned to a given channel, e.g., CNN. One such example is illustrated and discussed with regard to FIG. 3 above.

Application data/Messages can be delivered through IB channels by different methods, for example, vertical blanking interval (VBI) on analog channels can be used for this purpose. In digital channels, user private data and private data sections on the digital channels can be used for delivering the application data.

Figure 4:
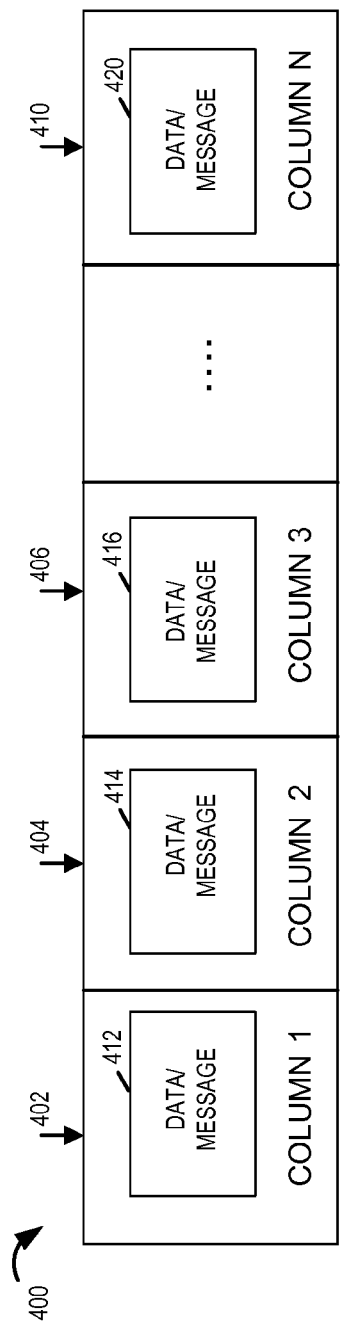
FIG. 4 illustrates an exemplary EISS event table and encapsulation of application data/messages to various columns of an event table in accordance with some exemplary embodiments.

In the case of EBIF (Enhanced TV binary interchange format) applications, data is delivered through one or both ETV PIDs (Packet Identifiers) included in the program. One of the ETV PID is the EISS (ETV integrated signaling stream) PID, and the other one is the resource PID. In some embodiments, application data can be encapsulated to EISS events and delivered through EISS PID. Each EISS event includes one event table. One event table has multiple columns. Multiple application data/messages can be encapsulated to multiple columns of an event table. An exemplary EISS event table 400 is illustrated in FIG. 4. The EISS event table 400 includes column 1 402 through column N 410 as shown. Application data/messages are encapsulated to various columns of the event table 400 as should be appreciated from the figure.

In some embodiments, data can also be delivered through ETV resource PID. In this case, in some embodiments the data is encapsulated as DSM-CC (Digital storage media-command and control) data carousel data module.

Figure 5:
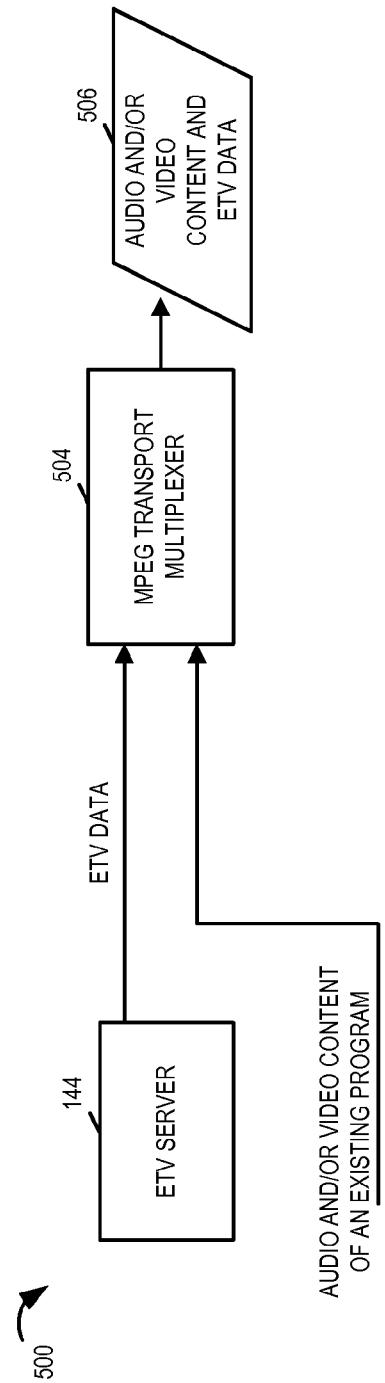
FIG. 5 illustrates multiplexing of ETV data generated by an ETV server to an audio/video program stream in accordance with an exemplary embodiment.

FIG. 5 is a drawing 500 illustrating how the ETV data generated by an ETV server 144 is multiplexed to an audio/video program stream through an MPEG transport multiplexer 504. Thus the multiplexer 504 multiplexes ETV PIDs into an existing program content stream. The output of the multiplexer 504 is the audio/video data multiplexed with ETV data shown in the figure as the combined data 506.

Figure 6A:
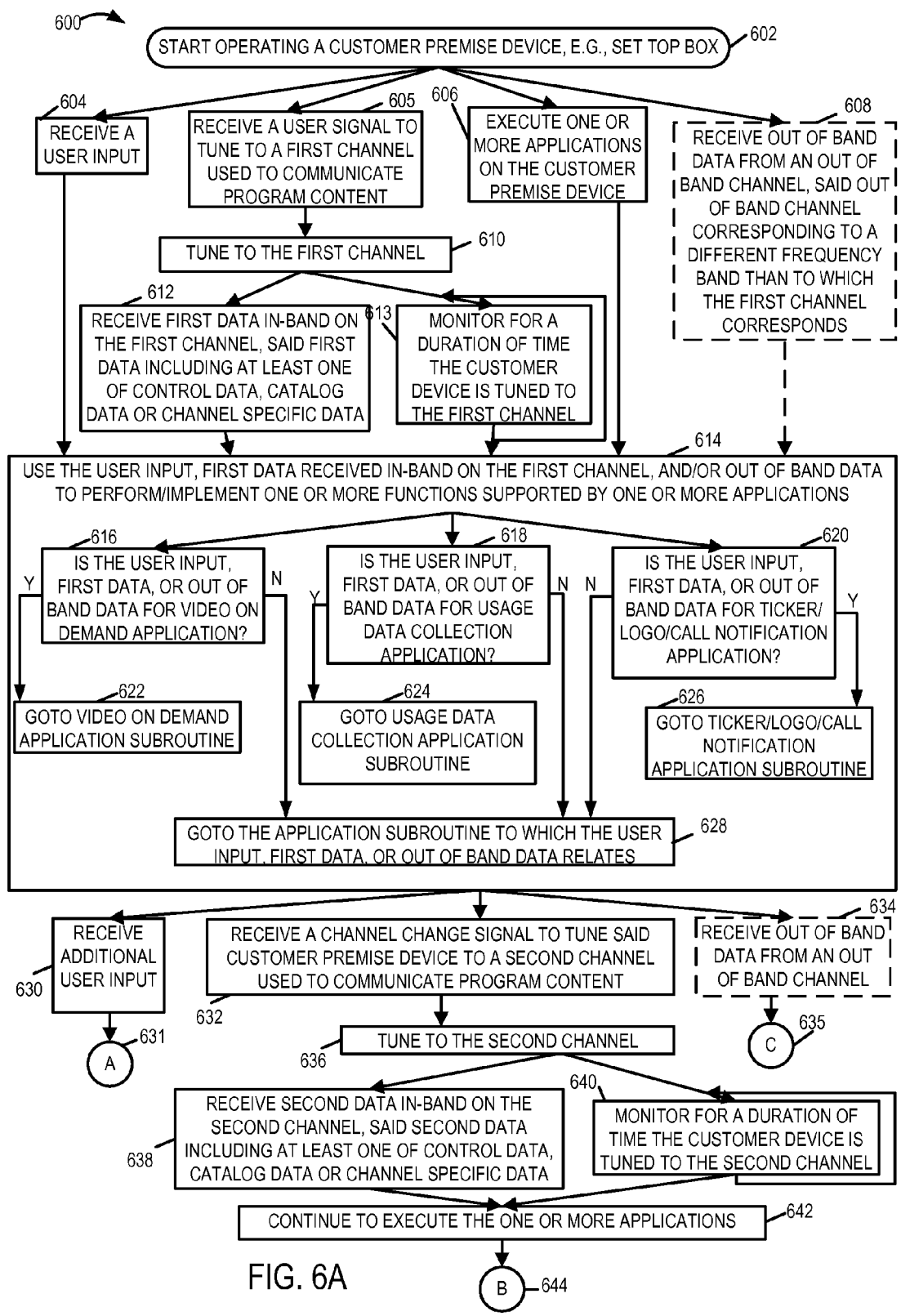
FIG. 6, which comprises the combination of FIG. 6A and FIG. 6B, is a flowchart illustrating the steps of an exemplary method performed in accordance with some embodiments of the invention.
Figure 6B:
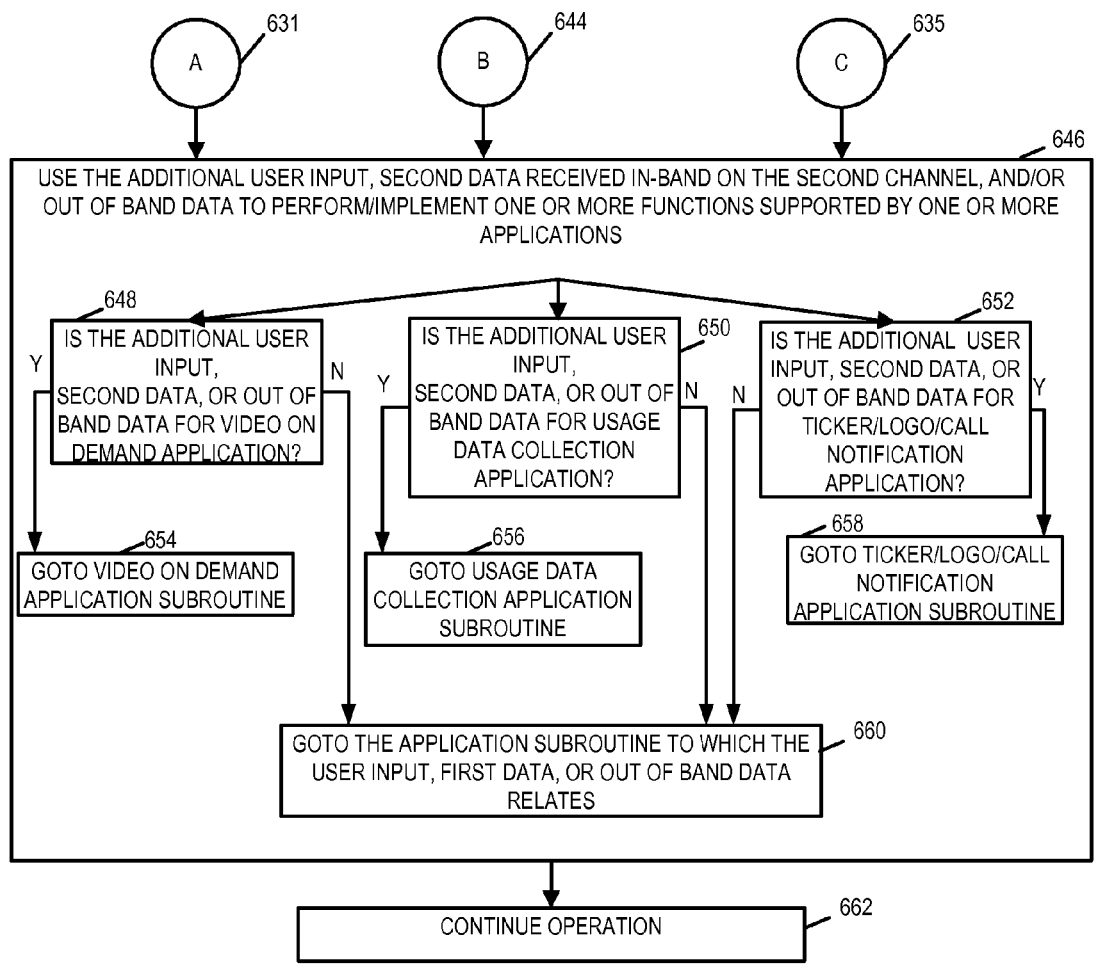

FIG. 6, which comprises the combination of FIG. 6A and FIG. 6B, is a flowchart 600 illustrating the steps of an exemplary method performed by a customer premise device, e.g., set top box 122, in accordance with one embodiment of the invention.

The method starts in step 602 with the set top box being placed into operation at a customer premise. Operation proceeds from start step 602 to steps 604, 605, 606, 608 which correspond to parallel processing paths. Processing and the receipt of data may occur in a asynchronous manner with different data and/or user input being received at different times. Accordingly it should be appreciated that while the processing paths are shown in parallel, the operations from a time perspective may occur sequential or in parallel depending on when data and/or input is received.

In step 604 user input is received. The input may be application control input and/or a variety of other types of user input which may be used to control STB applications. Operation proceeds from step 604 to step 614 in which the user input is processed and used.

In step 605 a user signal, e.g., from a remote control or other input device, used to control tuning of the STB is received. In the FIG. 6 example, the signal received in step 605 indicates the user wants to tune the STB to a first channel used to communicate program content, e.g., broadcast program content such as, e.g., TV program content. In step 610, the STB responds to the signal received in step 605 by tuning to the first channel. Operation proceeds from step 610 to steps 612, 613 which can occur serially or in parallel depending on when data is supplied to the STB. In step 612, the STB receives first data in-band on the first channel. The first data includes at least one of control data, catalog data or channel specific data. The catalog data, when received, may include a catalog of programs which were broadcast on the particular channel and/or will be broadcast in the near future. The in-band catalog information is limited, in some embodiments, to information relating to programs broadcast on the channel used to supply the in-band catalog information. Thus, the in-band catalog data received on a channel may, and in some embodiments does, only provide information for programs broadcast on the channel on which the in-band information is received. For example, if the channel is an ABC sports channel, in some embodiments the in-band catalog data will provide information only relating to ABC sports channel programs. The in-band catalog data may include a program identifier, program duration information, program channel number information, broadcast time information and/or other information identifying the program(s) broadcast on the channel and/or other information which can be used to request delivery of content corresponding to the broadcast programs after all or a portion a program is broadcast on the channel. In-band data may include other types of data a well such as log and/or ticker information to be displayed in conjunction with program content when a program broadcast on the first channel is output for display. Catalog and/or other in-band data may be received according to a schedule or at any time such data is sent on the channel, e.g., shortly before a logo or ticker is to be displayed.

Operation proceeds from step 612 to step 614 wherein the first data received in-band on the first channel is processed and/or displayed. As will be discussed below, the use of the received in-band data can vary depending on the application to which the data corresponds, e.g., depending on the application executed on the STB which uses the data. As will be discussed further below, in accordance with one feature of the invention, an unbound application which continues to run as a user controls the STB to switch from one channel to another, may change the set of in-band data that is used at any point in time to use the in-band data corresponding to the current channel to which the STB is tuned. Thus, in accordance with one feature, applications which use in-band supplied channel data need not stop and/or be restarted as the user switches between channels but the in-band supplied data used at a particular point in time may depend on the channel to which the STB is tuned at a given point in time.

After tuning to a channel, the STB monitors the duration a user remains on a channel. This occurs in step 613. For example, in step 613 the STB monitors the duration of time the customer device, e.g., STB, is tuned to the first channel. The arrow returning to the top of step 613 is shown to indicate that the monitoring is performed while the user stays tuned to the first channel. The amount of time the user has been on channel to which the STB is tuned is supplied on a regular basis to step 614 so that it is available for reporting to the headend if such information is requested.

In step 606 one or more applications are executed on the customer premise device after the STB is started. Exemplary applications which may be executed in step 606 includes a video on demand application, a data collection application, and a combined ticker display, logo display and/or telephone call notification application identified as a ticker/logo/call notification application. The applications executed in step 606 may be executed and implemented as individual subroutines and/or modules. The applications may be executed on or by a processor in the STB which also executes an operating system with which the applications executed in step 606 may interact. The applications executed in step 606 are available for use in 614 and may be used to process data and/or user input which is received by the STB.

In addition to receiving user and/or in-band data on a channel to which the STB is tuned, the customer premise device, e.g., STB, may also receive out of band data, e.g., data received on a different channel or frequency band than the broadcast channel used to deliver program or Video on Demand (VOD) content to which a tuner in the STB is tuned. The receipt of out-of-band data is shown in step 608. Exemplary out of band data may include, e.g., incoming call notification data communicating a telephone number and providing calling party identification information directed to specific customer premise and/or set top box. In some embodiments, out of band channel data is not used for some unbound applications and the unbound applications use only in-band data and/or user input. For example, in some embodiments start over and look back applications are implemented using only in-band supplied catalog data thus avoiding the need to use out of band communications to supply catalog data for such applications.

The out of band data received in step 608 is supplied to step 614. In step 614 user input and/or received data are used by one or more applications. The received data may include, e.g., in-band data and/or out of band data.

As data and/or user input is supplied to step 614 it is analyzed and/or processed in steps 616, 618 and 620 to determine the application or applications to which the data is to be supplied. Step 614 includes various steps, also referred to sometimes as substeps.

In step 616 a determination is made as to whether user input, first data (in-band data), or out of band data supplied to step 614 is for a video on demand application, e.g., a LookBack and/or StartOver application. If the input data is for the video on demand application, operation proceeds from step 616 to goto step 622 where operation proceeds to the on-demand application, which in some embodiments is implemented as a sub-routine such as the one shown in FIG. 7. If the input/data is not for the video on demand application operation proceeds from step 614 to step 628.

In step 618 a determination is made as to whether user input, first data (in-band data), or out of band data supplied to step 614 is for a usage data collection application, e.g., an application used to provide/report information to a headend device such as a server, what channel a CPE device is tuned to and for how long the device has been tuned to the channel. If the input data is for the data collection application, operation proceeds from step 618 to go to step 624 where operation proceeds to the channel usage data collection application, e.g., subroutine, which in some embodiments is implemented as a sub-routine such as the one shown in FIG. 8. If the input/data is not for the channel usage data collection application operation proceeds from step 618 to step 628.

In step 620 a determination is made as to whether user input, first data (in-band data), or out of band data supplied to step 614 is for a combined ticker display, logo display and call notification application capable of displaying a ticker, displaying a logo, or displaying call notification information. If the input data is for the ticker display/logo display/call notification application, operation proceeds from step 620 to go to step 626 where operation proceeds to the ticker/logo/call notification application, e.g., subroutine, which in some embodiments is implemented as a sub-routine such as the one shown in FIG. 9. If the input/data is not for the ticker/logo/call notification application operation proceeds from step 620 to step to step 628.

In step 628 operation goes to the application subroutine to which the user input, first data (in-band data), or out of band data relates. Thus, is should be appreciated that step 628 can be used to call an application to which data relates when the application is not called by one of the other go to steps shown in step 614.

Applications called by one of the go to steps 622, 624, 626, 628 process the received input data and perform the functions/services to which the application relates. Notably the VOD application, channel usage data collection application and ticker/logo/call notification application are unbound applications in that they continue to run regardless of which program channel a user tunes the STB to. The data used at any particular point in time may change depending on what channel the STB is tuned to at a particular time but the applications shown in FIGS. 7, 8 and 9 do not shut down when a user tunes away from a current channel and then restart when a user tunes to a new channel. However, as new in-band or out of band data is received the new data will be used. Thus, for example when a user switches from an ABC network program channel to a CBS network channel, the applications will stop using the in-band channel and program specific information received on the channel to which the tuner was tuned and begin user the in-band channel and program specific information received on the new channel to which the STB tuner is tuned. If an application uses both in-band data and out of band data, the application will continue to use the out of band data despite a change in the channel to which the STB is tuned and the use of new in-band data. The out of band data will continue to be used until it is replaced or updated with new data received via an out of band channel, e.g., a data or control channel used to supply the STB with out of band data.

It should be appreciated that the receipt of user input, in-band data and/or out of band data can cause the processing shown in step 614 to repeated, e.g., for each set of new data that is received. While the receipt of data and user input is can, and in some embodiment is, implemented as an iterative or repeating process, for purposes of explaining the invention multiple iterations are shown serially in the FIG. 6 example. For example, the operations that follow step 614 show the receipt of various data and/or user input that may be received followed by processing (see step 646) which is the same or similar to that which is shown in step 614.

In FIG. 6, operation process from step 614 to steps 630, 632, and 634. In step 630 additional user input is received. Operation proceeds from step 630 via connecting node A 631 to step 646.

In step 632 a channel change request is received from a user input device, e.g., a remote control, indicating a user desire to change from the current program channel to a second channel, e.g., another program channel used to broadcast program content. Operation proceeds from step 632 to step 636 wherein the customer premise device, e.g., STB, tunes to a second channel, e.g., a channel indicated by the signal received in step 632. Operation proceeds from step 636 to steps 638 and 640. In step 638 in-band data, e.g., second data, is received on the second channel to which the STB is tuned. The second data includes at least one of control data (e.g., a control message or control signal), channel catalog data, or channel specific data. Thus, in step 638 the STB receives data on the new channel to which the STB is tuned. Operation proceeds from step 638 to step 642. In step 640, monitoring is performed to determine how long the STB remains on the second channel. This information can be supplied to a head-end in response to a control signal, e.g., an in-band control message which can be in used to collect usage information. Operation proceeds from step 640 to step 642.

In step 642 the one or more applications which were executed in step 606 continue to execute uninterrupted by the fact that the channel to which the customer premise device, e.g., STB, is tuned changes from the first channel to the second channel. Thus, the application are unbound in that they are not shut down and restarted as the STB changes the channel to which it is tuned.

Operation proceeds from step 642 to step 646 via connecting node B 644.

In step 634 out of band data from an out of band channel is received. Operation proceeds from step 634 to step 646 via connecting node 635.

Step 635 is similar to step 614 in that receipt of user input and/or data corresponding to an application results in a call to the application to which the user input and/or data relates. However, in step 646 the in-band data received on the second program channel is used instead of the in-band data received on the first channel given that at the time step 646 is implemented the STB tuner is tuned to the second channel.

As data and/or user input is supplied to step 646 it is analyzed and/or processed in steps 648, 650 and 652 to determine the application or applications to which the data is to be supplied. Step 646 includes various steps, also referred to sometimes as substeps.

In step 648 a determination is made as to whether user input, second data (in-band data), or out of band data supplied to step 646 is for a video on demand application, e.g., the LookBack and/or StartOver application. If the input data is for the video on demand application, operation proceeds from step 648 to go to step 654 wherein operation proceeds to the video on-demand application, which in some embodiments is implemented as a sub-routine such as the one shown in FIG. 7. If the input/data is not for the video on demand application operation proceeds from step 648 to step 660.

In step 650 a determination is made as to whether user input, second data (in-band data), or out of band data supplied to step 646 is for a usage data collection application, e.g., an application used to provide/report information to a headend device such as a server, what channel a CPE device is tuned to and for how long the device has been tuned to the channel. If the input data is for the data collection application, operation proceeds from step 650 to go to step 656 where operation proceeds to the channel usage data collection application, e.g., subroutine, which in some embodiments is implemented as a sub-routine such as the one shown in FIG. 8. If the input/data is not for the channel usage data collection application operation proceeds from step 650 to step 660.

In step 652 a determination is made as to whether user input, second data (in-band data), or out of band data supplied to step 646 is for the combined ticker display, logo display and call notification application capable of displaying a ticker, displaying a logo, or displaying call notification information. If the input is for the ticker/logo/call notification application, operation proceeds from step 652 to go to step 658 where operation proceeds to the ticker/logo/call notification application, e.g., subroutine, which in some embodiments is implemented as a sub-routine such as the one shown in FIG. 9. If the input/data is not for the ticker/logo/call notification application subroutine application operation proceeds from step 652 to step to step 660.

In step 660 operation goes to the application subroutine to which the user input, second data (in-band data), or out of band data relates. Thus, is should be appreciated that step 660 can be used to call an application to which data relates when the application is not called by one of the other go to steps shown in step 646.

Operation continues from step 646, e.g., with additional input being received and processed and the applications executed in step 606 continuing to execute. In some embodiments the continuing operation is achieved by operation proceeding from step 646 back to the steps 630, 632, 634 with the STB routinely monitoring for user input, in-band data and out of band data. Received data and/or user input is then processed by the appropriate application when it is received with the tuner switching between program channels in response to user change channel commands entered, e.g., via a remote control.

The unbounded applications which can use in-band data described in the present application can be loaded onto the set top box as in-band STB application update. For example, an unbound application can and in some embodiments is downloaded to a STB along with program content and then executed by the STB. The unbound application provided to the STB using in-band channel signaling can, and in some embodiments does, continue to run even after the STB switches to a channel other than the channel which was used to load the application onto the STB.

In some embodiment out of band data is communicated using a data channel that corresponds to a frequency that is not used to communicate program, e.g., audio and/or video content, to the STB.

While a STB has been used as the exemplary customer premise device 602 which implements the method shown in FIG. 6, it should be appreciated that the customer device could by a television with application functionality or another customer premise device capable of tuning to program channels and executing applications which can process content received via program channels.

Video output generated by the set top box which implements the method shown in FIG. 6 is output to a television and/or other display device for display. Since unbound application continue to run as channel are switched, in accordance with the present invention the video output by the programs and/or the functionality of the applications may change as a user switches channels but, significantly, without the STB having to shut down and restart the application.

Figure 7:
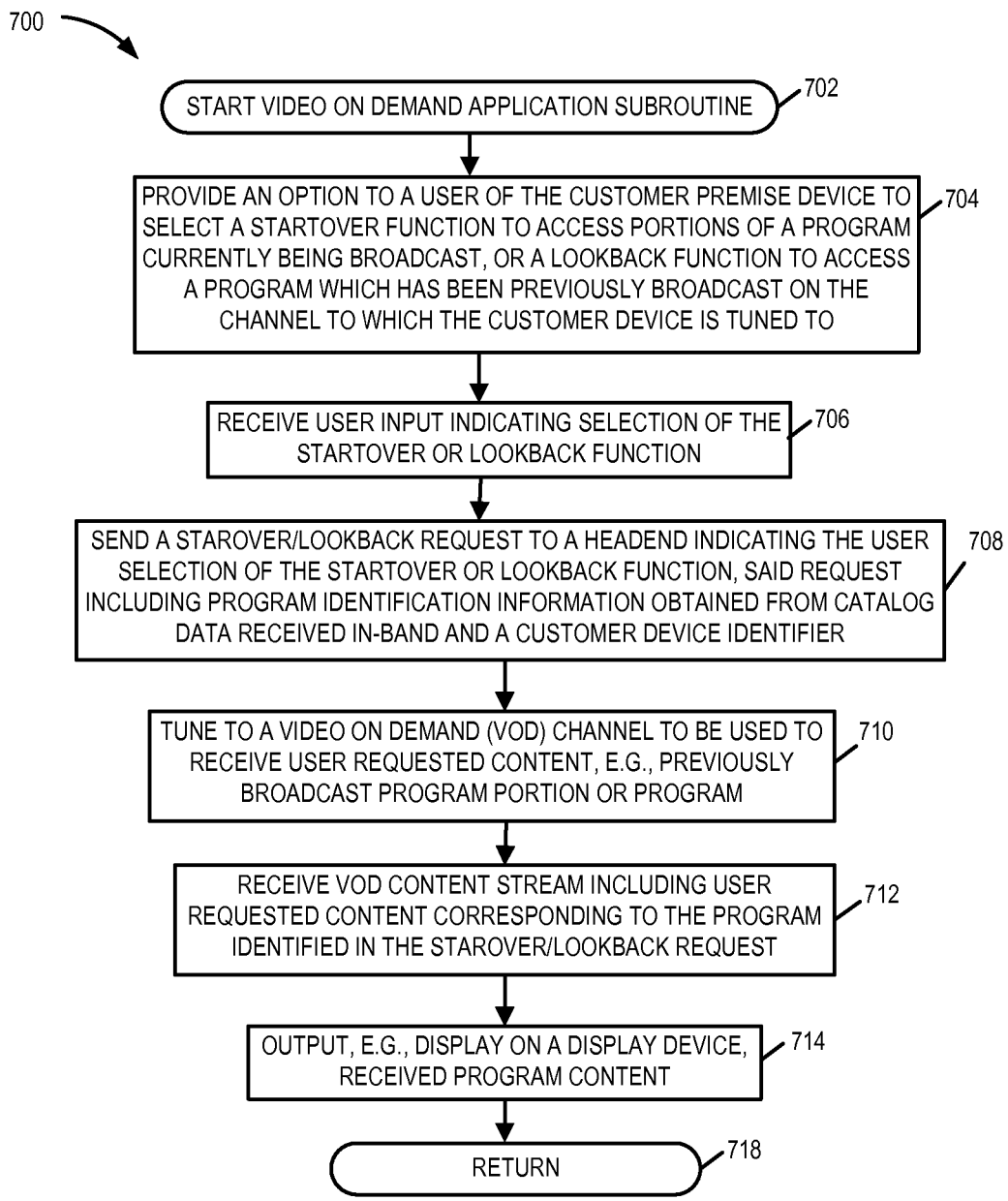
FIG. 7 illustrates the steps of an exemplary method performed when an exemplary video on demand (VOD) application is executed, in accordance with some embodiments of the invention.

FIG. 7 is a flowchart 700 illustrating the steps of an exemplary method performed when an exemplary video on demand (VOD) application is executed, in accordance with some embodiments of the invention. The video on demand application subroutine shown in flowchart 700 starts in step 702 where the subroutine is executed in the customer premise device, e.g., STB 122.

Operation proceeds from step 702 to step 704. In step 704 the VOD application control presentation of an option to a user of the STB device to select a StartOver function supported by the VOD application to access portions of a program currently being broadcast or previously broadcast on a channel to which the STB is tuned, e.g., the first channel, or a LookBack function to access a program which has been previously broadcast on the channel to which the STB is tuned to. In some embodiments, the VOD application supports both StartOver and LookBack functions. Thus in accordance with step 704 an option is presented, e.g., displayed, to the user and the user can select if he/she wants to use the functions.

Operation proceeds from step 704 to step 706. In step 706 the STB receives a user input, e.g., sent via a remote control, indicating user's selection of StartOver or LookBack function. Operation proceeds from step 706 to step 708. In step 708 the STB sends a StartOver/LookBack request to the headend 102 indicating the user's selection of the StartOver or LookBack function, the request including program identification information obtained from catalog data received in-band, e.g., on the first channel, and a customer device identifier, e.g., the STB 122 identifier. It should be appreciated that such information is sent to the headend 102 to identify the requested program to be delivered and the STB to which the requested program is to be delivered.

Operation proceeds from step 708 to step 710. In step 710 is controlled to tune to a VOD channel to be used to receive the user requested content, e.g., the previously broadcast program portion or the program. In some embodiments the tuning of the STB to the VOD channel is in response to an instruction communicated to the STB 122 by the headend 102 instructing to tune to a specific frequency band corresponding to the VOD channel.

Operation proceeds from step 710 to step 712. In step 712 the STB receives VOD content stream communicating the user requested program content corresponding to the program identified in the StartOver/LookBack request.

Operation proceeds from step 712 to step 714. In step 714 the STB outputs, e.g., controls a display device to display, the received program content. Operation proceeds from step 714 to the return step 718.

Figure 8:
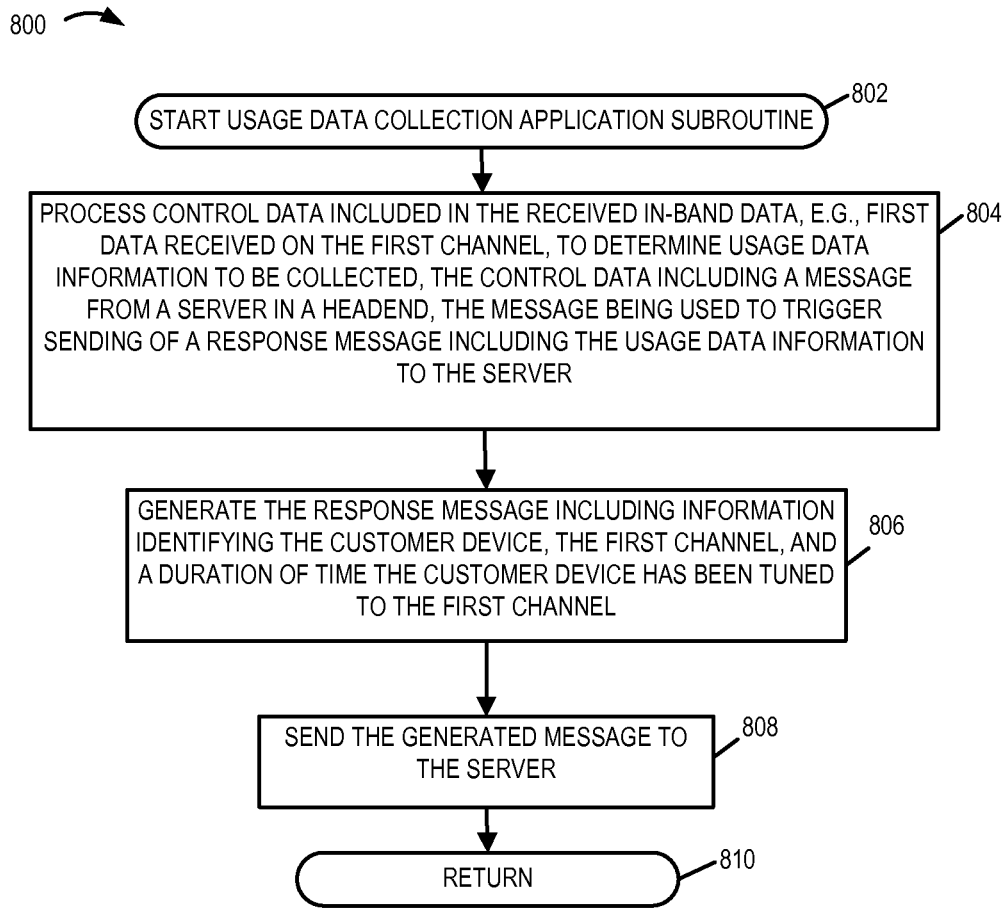
FIG. 8 illustrates the steps of an exemplary method performed when an exemplary usage data collection application is executed, in accordance with some embodiments of the invention.

FIG. 8 is a flowchart 800 illustrating the steps of an exemplary method performed when an exemplary usage data collection application is executed, in accordance with some embodiments of the invention. The usage data collection application subroutine shown in flowchart 800 starts in step 802 where the subroutine is executed in the customer premise device, e.g., STB 122.

Operation proceeds from step 802 to step 804. In step 804 control data for the usage data collection application, included in the received in-band first data, is processed to determine what type of usage data information is to be collected and sent to a server in the headend 102. In various embodiments the control data for the usage data collection application received in-band on the channel to which the STB 122 is tuned, e.g., the first channel, includes a message from the server used to trigger sending of a response message including the usage data information to the server. Thus the message from the server included in the control data triggers generation of a message including the usage data.

Operation proceeds from step 804 to step 806. In step 806 the application controls the STB 122 to generate a response message including information identifying the customer premise device responding to said control data, i.e., the STB 122, the first channel to which the STB is tuned, and a duration of time the customer premise device has been tuned to the first channel.

Operation proceeds from step 806 to step 808. In step 808 the application controls the STB 122 to send the generated message including the usage data information to the server in the headend 102. In some embodiments this information can be used by the headend server to track set top box tuning and/or customer viewing of broadcast programs and/or given broadcast channels. Operation proceeds from step 808 to the return step 810.

Figure 9:
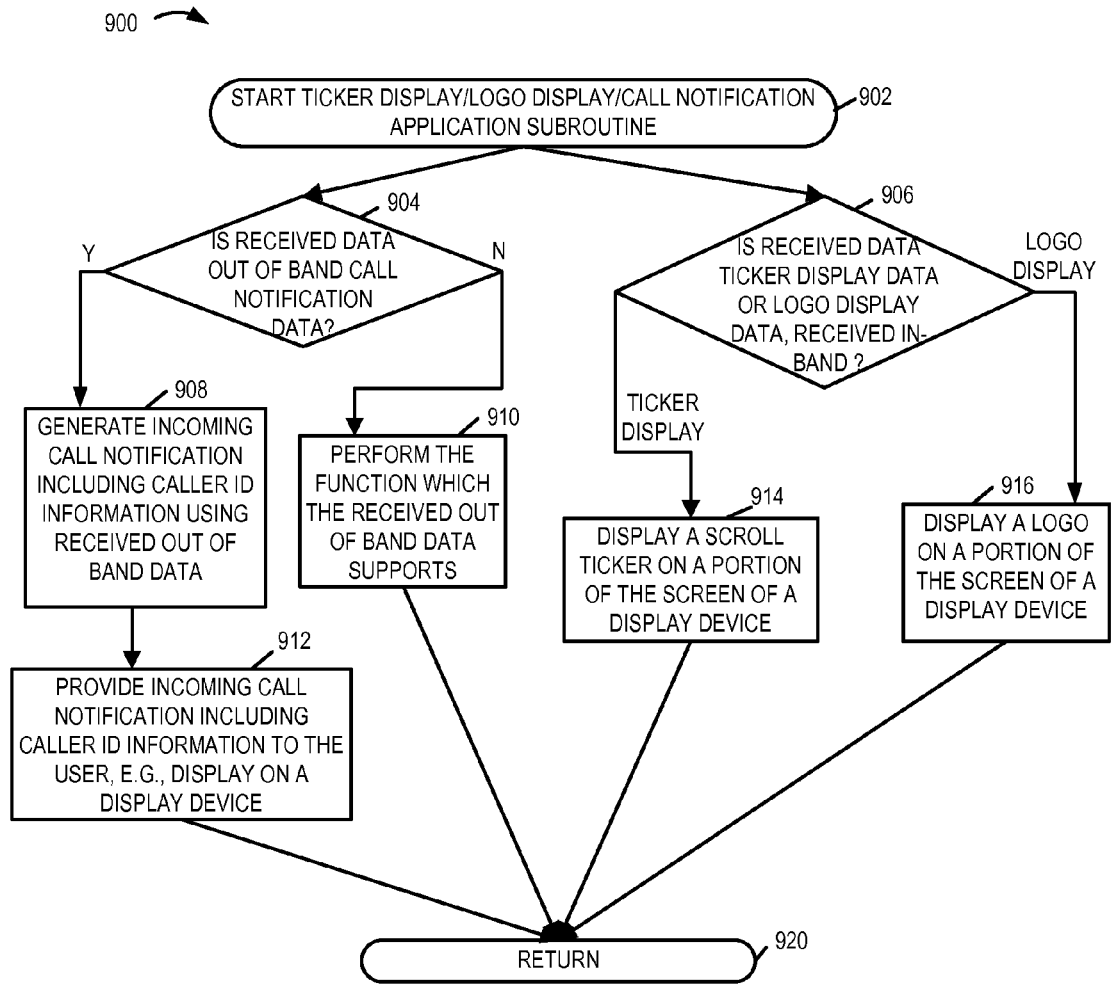
FIG. 9 illustrates the steps of an exemplary method performed when an exemplary Ticker display/Logo display/incoming call notification application is executed, in accordance with some embodiments of the invention.

FIG. 9 is a flowchart 900 illustrating the steps of an exemplary method performed when an exemplary Ticker display/logo display/Incoming call notification application is executed, in accordance with some embodiments of the invention. The Ticker display/logo display/Incoming call notification application subroutine shown in flowchart 900 starts in step 902 where the subroutine is executed in the customer premise device, e.g., STB 122.

As will be discussed, the exemplary Ticker display/logo display/Incoming call notification application is an example of a single unbound application that can perform multiple different functions depending on the application data provided to the application via in-band and/or out of band channels.

Operation proceeds from start step 902 to steps determination/decision 904 and 906. In step 904 it is determined whether or not the received data for the Ticker display/logo display/Incoming call notification application is out of band call notification data. If it is determined that the received out of band data is call notification data then the operation proceeds from step 904 to step 908 otherwise the operation proceeds from step 904 to step 910.

In step 908 the application controls generation of incoming call notification including caller ID information using the received out of band incoming call data. Operation proceeds from step 908 to step 912. In step 912 the incoming call notification including the called ID information is provided to the user, e.g., displayed on the screen of the user's display device. Operation proceeds from step 912 to the return step 920.

When in step 904 it is determined that the received out of band data is not call notification data then the operation proceeds from step 904 to step 912 wherein the application performs the function which the received out of band data supports.

Returning now to step 906. In step 906 it is determined whether or not the in-band data, received on the channel STB 122 is tuned to, is Ticker display data or Logo display data. The Ticker display/logo display/Incoming call notification application supports both Ticker display and logo display functions and depending on the received application data performs the intended function. If in step 906 it is determined that the received in-band data is for the Ticker display function, the operation proceeds from step 906 to step 914. In step 914 the application controls the STB 122 to display a scroll ticker on a portion of the user's display device screen. Operation proceeds from step 914 to the return step 920.

If it is determined in step 906 that the received in-band data is for the Logo display function, the operation proceeds from step 906 to step 916. In step 916 the application controls the STB 122 to display a Logo, e.g., a channel logo corresponding to the channel to which the STB 122 is tuned, on a portion of the user's display device screen. Operation proceeds from step 916 to the return step 920.

Figure 10:
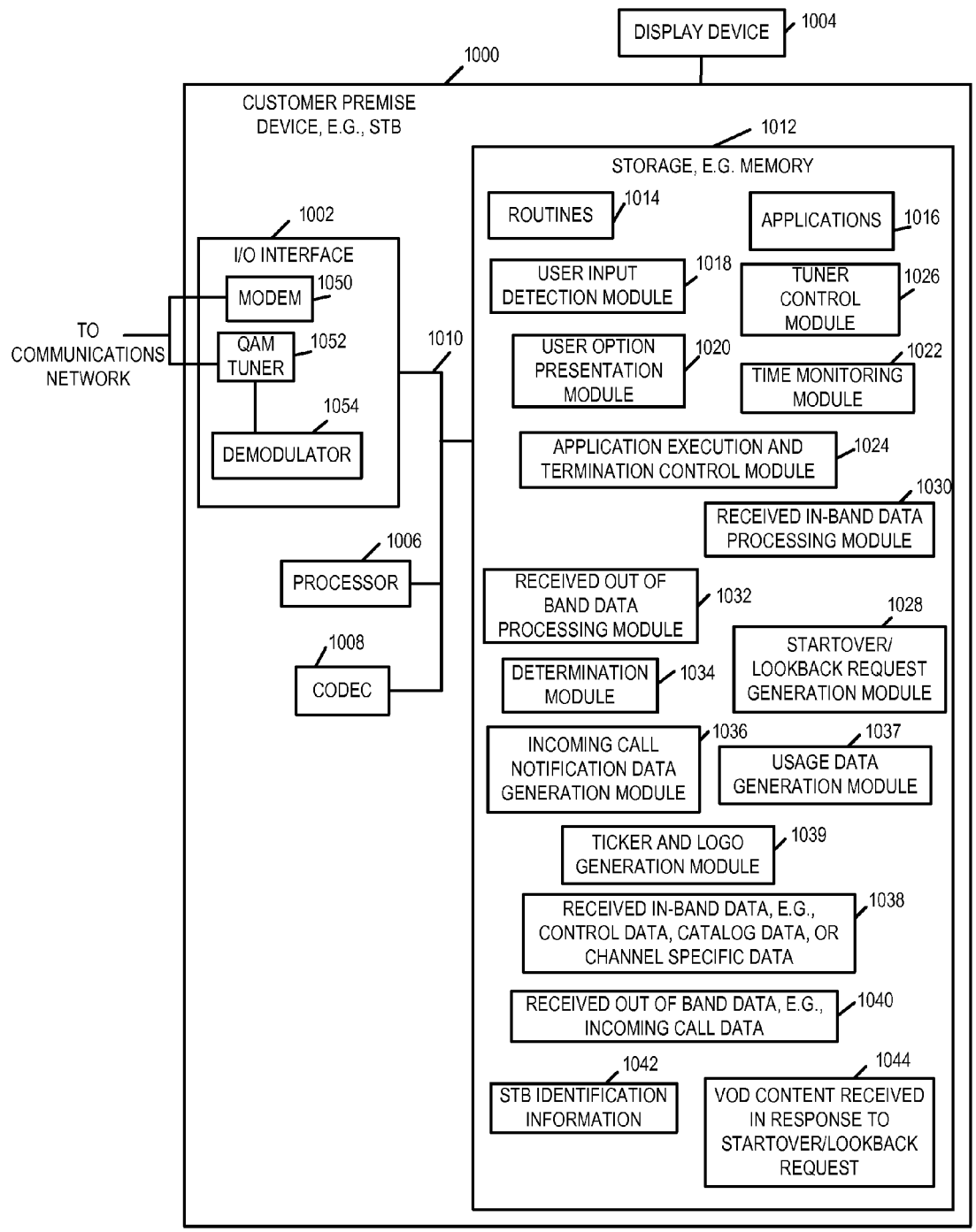
FIG. 10 illustrates an exemplary customer premise device, e.g., a set top box, which may be used in the exemplary communications network of FIG. 1.

FIG. 10 illustrates an exemplary customer premise device 1000, e.g., a set top box, implemented in accordance with one exemplary embodiment. The customer premise device 1000 may be used as any one of the STBs 122, 130 of the system shown in FIG. 1. As shown, the STB 1000 is coupled to a display device 1004, e.g. a monitor and/or a Television (TV). The STB 1000 includes an Input/Output (I/O) interface 1002, a processor 1006, a codec (Coder/Decoder) 1008, and a storage device, e.g. a memory 1012 coupled together via a bus 1010. The various elements of the STB 1000 can exchange data and information over the bus 1010. Via the I/O interface 1002, the STB 1000 can exchange signals and/or information with other devices and/or system elements such as the servers in the network head end 102, via the communications network 176. The I/O interface 1002 supports the receipt and/or transmission of content, application data and/or other information from/to different servers, e.g., the BFS/VOD server, application server, etc., as represented by arrow 1060. The I/O interface 1002 in some embodiments also includes, e.g., an infrared signal receiver to receive signals from a user remote control device. The I/O interface 1002 includes a modem 1050 which supports receiving content, and out of band data. The I/O interface 1002 further includes a QAM tuner 1052 and a demodulator 1054. The QAM tuner 1052 receives programming content and in-band data, e.g., through in-band channel to which the STB 1000 is tuned. The demodulator 1054 demodulates the received content and/or information.

The processor 1006, e.g., a CPU, executes routines 1014 and one or more applications 1016 and controls the STB 1000 to operate in accordance with the invention. The processor 1006 is responsible for general operation of the set top box 1000 including, e.g., presentation of information and/or programs for display. To control the STB 1000, the processor 1006 uses information, various modules and/or routines including instructions stored in memory 1012. The Codec 1008 is implemented as a module and is capable of performing encoding and/or decoding operations on a digital data stream or signal.

In addition to the routines, the memory 1012 includes applications 1016, a user input detection module 1018, a tuner control module 1026, a user option presentation module 1020, a time monitoring module 1022, an application execution and termination control module 1024, a StartOver/LookBack request generation module 1028, a received in-band data processing module 1030, a received out of band data processing module 1032, a determination module 1034, an incoming call notification data generation module 1036, usage data generation module 1037, received in-band data 1038, ticker and logo generation module 1039, received out of band data 1040, STB identification information 1042, VOD content received in response to a StartOver/LookBack request.

Routines 1014 include communications routines and/or set top box control routines. Applications 1016 include one or more exemplary applications discussed above including VOD application supporting StartOver and LookBack functions, usage data collection application, Ticker display/Logo display/Incoming call notification application etc. The applications 1016 use one or more of the modules in the memory to perform various exemplary functions discussed above, e.g., StartOver, LookBack, usage data collection, ticker/logo display etc. For example, when executed, the VOD application included in applications 1016 may use StartOver/LookBack request generation module 1028, received in-band data 1038, StartOver/LookBack request generation module 1028 etc., to perform the functions supported by the VOD application. Similarly usage data collection application may use various modules including time monitoring module 1022, usage data generation module 103, received in-band data 1038 etc. to perform the functions supported by the usage data collection application.

User input detection module 1018 detects a user input, e.g., input from a user received by the STB. The user input may be sent by a control device such as a remote control, or by other means. User input signals from a remote control may be received via I/O module 1002 which may include, in addition to a cable network interface, an IR or radio interface for receiving signals from a remote control device.

The user input detection module 1018 determines, on receipt of an input, e.g., a control signal providing user input, what type of selection has been made by the user, e.g., a channel selection instructing to tune to a specific channel, a program guide selection, etc.

The tuner control module 1026 is configured to control the tuner 1052 to tune to a frequency corresponding to a program channel to be viewed. This may be a user selected channel or, a channel to be tuned to when instructed by a server in the headend 102. The user option presentation module 1020 supports the interaction between the user of the STB 200 and the network head end 102 through the STB 200. The user option presentation module 230, in some embodiments, controls presentation of prompts, specific messages, logos, tickers, etc., on the user display device screen when one or more exemplary applications are executed to perform various functions in accordance with the invention.

The time monitoring module 1022 monitors and records the time for which the STB 1000 stays tuned to a given program channel, e.g., when a user is watching the given program channel. Application execution and termination control module 1024 controls execution and termination of applications on the STB 1000. Thus in some embodiments the application execution and termination control module is configured to execute an application on the customer premise device, said application using first data received in-band on a first channel used to communicate program content, said first data including at least one of control data, catalog data or channel specific data. In some embodiments the application execution and termination control module is further configured to continue to execute said application using second data received in-band on a second channel in place of said first data previously received on said first channel when the STB 1000 is tuned to the second channel, said second data including at least one of control data, catalog data or channel specific data.

StartOver/LookBack request generation module 1028 works under the control of the VOD application included in the applications 1016 that supports StartOver/LookBack functions, and is configured to generate a StartOver/LookBack request indicating the user selection of the StartOver or LookBack function.

Received in-band data processing module 1030 processes the received in-band data, e.g., catalog data and/or other application data received in-band on a channel to which the STB 1000 is tuned to at a given time. Thus the received in-band data processing module 1030 retrieves the catalog data and/or other application data received in-band from the received in-band content. Received out of band data processing module 1032 processes the received out of band data, e.g., incoming call notification data, caller ID data an/or other information, received out of band. Thus as a result of processing the received out of band data processing module 1032 retrieves the incoming call notification data, caller ID data an/or other information from the received out of band information.

Determination module 1034 performs various determination functions, e.g., determination tasks discussed in steps 616, 618, 620, 648, 650, 652, 804, 904, 906 etc., in FIGS. 6-9.

Incoming call notification data generation module 1036 is controlled by the exemplary incoming call notification application included in applications module 1016 to generate incoming call notification data including caller ID when it is determined that received out of band data is an incoming call notification. Accordingly, the incoming call notification data generation module 1036 uses the received out of band data relating to an incoming call and generates incoming call notification including caller ID information in a format suitable for display to the user. Usage data generation module 1037 is controlled by the exemplary usage data collection application included in applications module 1016 to generate usage information when the application is in use. When the usage data collection application is running and the received in-band data includes control data from a server in the headend 102 used to trigger sending of a response message including usage data for a channel to which the STB 1000 is tuned to, the usage data collection application controls the usage data generation module 1037 to generate a response message including channel usage information to be sent to the headend 102. The response message includes information identifying the STB 1000, the channel to which the STB 1000 is tuned to, and a duration of time the STB 1000 has been tuned to that channel. In various embodiments, the timing information regarding the duration of time the STB 1000 has been tuned to a given channel is obtained from the time monitoring module 1022.

Ticker and logo generation module 1039 is controlled by the Ticker/Logo display application included in applications 1016 to generate tickers and logos, e.g., program channel logos, for display. For example, when Ticker/Logo display/Call notification application is running and received in-band data is ticker display data or logo display data then the application controls the ticker and logo generation module 1039 to generate tickers and/or logos for display to the user.

In some embodiments one or more of the above discussed modules work under the control of the applications 1016 and may be included in the applications module 1016. In some embodiments, one or more of the various modules discussed above work in coordination, e.g., with operations being merged to perform a function, to produce a desired output in accordance with the exemplary methods of the invention.

Received in-band data 1038 represents the data which is received in-band, e.g., received on the channel to which STB 1000 is tuned to. In some embodiments the received in-band data 1038 includes, besides audio and/or video content corresponding to the channel, one or more of control data, catalog data, channel specific data and/or other application data supporting an unbound application in accordance with one aspect of the invention. Received out of band data 1040 represents the data which is received out of band. In some embodiments the received out of band data 1040 includes incoming call information including caller ID information.

The STB identification information 1042 may include, e.g., Media Access Control (MAC) address of the STB or some other identifier. VOD content received in response to StartOver/LookBack request 1044 is the user request content, e.g., a previously broadcast program or program portion, which is received on a VOD channel in some embodiments. In the StartOver/LookBack request the requested program and/or program portion is identified and the content 1044 is received in response. In various embodiments, the StartOver/LookBack application controls the display of the received VOD content 1044 on the user display device 1004.

An exemplary method of operating a customer premise device, in accordance with some embodiments, comprises: executing an application on said customer premise device, said application using first data received in-band on a first channel used to communicate program content, said first data including at least one of control data, catalog data or channel specific data; tuning said customer premise device to a second channel used to communicate program content; and continuing to execute said application using second data received in-band on said second channel in place of said first data previously received on said first channel, said second data including at least one of control data, catalog data or channel specific data. In some embodiments the customer device implementing the method is a set top box.

In some embodiments the catalog data is channel specific catalog data. In some such embodiments the catalog data received in-band on a given channel to which the customer device is tuned is specific to that channel. Thus in some embodiments catalog data received in-band on CNN channel is specific to CNN channel.

In various embodiments the application continues to run and does not terminate when the customer premise device tunes from the first channel to the second channel. In some embodiments the application is an unbound application.

In various embodiments the applications implemented in STB or other customer premise device are eBIF applications. For example, in some embodiments the applications shown and described in regard to FIGS. 6-9 are EBIF applications.

In some embodiments the first data is catalog data including information identifying a program currently being broadcast or which has been previously broadcast on said first channel, and information which can be used to access portions of said program which have already been broadcast via said first channel. Thus the first data received in-band supports application used to perform StartOver and LookBack functions.

In some embodiments the first data is catalog data including information identifying programs previously broadcast on said first channel and information that can be used to access the previously broadcast programs. In some embodiments the previously broadcast programs are programs that were previously broadcast within a set time period. In some embodiments the set time period is 72 hours.

In some embodiments the first data is received while a broadcast program is being received via said first channel and displayed, and the first data is used to support a video on demand (VOD) application using which a user can control streaming of stored content corresponding to a portion of said broadcast program which has previously been broadcast on said first channel. In some embodiments the VOD application supports at least one of program StartOver and program LookBack function.

In some embodiments the first and second data is delivered using one of (i) a vertical blanking interval (VBI) to communicate said first and second data on an analog channel, (ii) user private data section on a digital channel or (iii) private data section on a digital channel.

In some embodiments the application is a usage data collection application, said first or second data being control data used to trigger sending of a response message to a server. In some such embodiments the exemplary method further comprise sending a response message to a server, said response message identifying the customer premise device responding to said control data.

In some embodiments the control data is a message from said server used to trigger the sending of said response message. In some embodiments the response message includes information indicating a channel an identified STB is tuned to and the duration of time the STB has been tuned to the identified channel. In some embodiments this information can be used by a server to track set top box tuning and/or customer viewing of broadcast programs and/or broadcast channels.

In some embodiments the application uses, in addition to said first data received in-band, data obtained from an out of band channel, said out of band channel corresponding to a different frequency band than the frequency band to which the first channel corresponds. In some embodiments the application supports incoming call notification functions including caller ID in addition to a StartOver function and LookBack function, said incoming call notification function using data received using an out of band channel, said StartOver and LookBack functions using catalog data obtained from a broadcast channel used to deliver program content the customer premise device is tuned to at the time the function is provided.

In various embodiments the functionality provided by the application varies depending on data obtained from a channel to which the customer premise device is tuned to. In some embodiments the application provides a ticker information display function when the device is tuned to the first channel and a logo display function when tuned to a second channel, said first data being ticker data being supplied to said customer premise device via said first channel, and said second data being logo data being supplied to said customer premise device via the second channel.

An exemplary customer premise device, e.g., a set top box, in accordance with some embodiments of the invention comprises: an application execution module configured to execute an application on said customer premise device, said application using first data received in-band on a first channel used to communicate program content, said first data including at least one of control data, catalog data or channel specific data; and a tuner control module configured to control a tuner in said customer premise device to tune to a second channel used to communicate program content. In some embodiments the application execution module is further configured to continue to execute said application using second data received in-band on said second channel in place of said first data previously received on said first channel, said second data including at least one of control data, catalog data or channel specific data.

In some embodiments the catalog data is channel specific catalog data. In some such embodiments the catalog data received in-band on a given channel to which the customer device is tuned is specific to that channel. Thus in some embodiments catalog data received in-band on, e.g., CNN channel, is specific to CNN channel.

In various embodiments said application is an unbound application and continues to run and does not terminate when the customer premise device tunes from the first channel to the second channel.

In various embodiments the applications implemented in the exemplary customer premise device include eBIF applications.

In some embodiments the first data received by the customer premise device is catalog data including information identifying a program currently being broadcast or which has been previously broadcast on said first channel, and information which can be used to access portions of said program which have already been broadcast via said first channel. Thus the first data received in-band supports application used to perform StartOver and LookBack functions.

In some embodiments the first data is received while a broadcast program is being received via said first channel and displayed, and the first data is used to support a video on demand (VOD) application, e.g., such as the StartOver/LookBack application, using which a user can control streaming of stored content corresponding to a portion of said broadcast program which has previously been broadcast on said first channel. In some embodiments the VOD application supports at least one of program StartOver or program LookBack function.

In some embodiments the first and second data is delivered to the customer premise device using one of (i) a vertical blanking interval (VBI) to communicate said first and second data on an analog channel, (ii) user private data section on a digital channel or (iii) private data section on a digital channel.

In some embodiments the application being executed by the application execution and termination control module is a usage data collection application, said first or second data being control data used to trigger sending of a response message to a server. In some such embodiments the exemplary customer premise device further comprises a usage data generation module for generating and sending a response message to a server, said response message identifying the customer premise device responding to said control data. In some embodiments the control data is a message from said server used to trigger the sending of said response message. In some embodiments the response message includes information indicating a channel an identified STB is tuned to and the duration of time the STB has been tuned to the identified channel. In some embodiments this information can be used by a server to track set top box tuning and/or customer viewing of broadcast programs and/or broadcast channels.

In some embodiments the application being executed by the application execution and termination control module uses, in addition to said first data received in-band, data obtained from an out of band channel, said out of band channel corresponding to a different frequency band than the frequency band to which the first channel corresponds. In some embodiments the application being executed by the application execution and termination control module supports incoming call notification functions including caller ID in addition to a StartOver function and LookBack function, said incoming call notification function using data received using an out of band channel, said StartOver and LookBack functions using catalog data obtained from a broadcast channel used to deliver program content the customer premise device is tuned to at the time the function is provided.

In various embodiments the functionality provided by the application being executed by the application execution and termination control module varies depending on data obtained from a channel to which the customer premise device is tuned to. In some embodiments the application provides a ticker information display function when the device is tuned to the first channel and a logo display function when tuned to a second channel, said first data being ticker data being supplied to said customer premise device via said first channel, and said second data being logo data being supplied to said customer premise device via the second channel.

In various embodiments system elements described herein are implemented using one or more modules which are used to perform the steps corresponding to one or more methods of the present invention, for example, receiving user inputs, executing an application on a customer premise device, receiving data in-band on a first channel used to communicate program content; tuning the customer premise device to a second channel used to communicate program content; continuing to execute said application using second data received in-band on the second channel.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating a customer premise device, the method comprising:
   executing an unbound application on said customer premise device, said unbound application using, while said customer premise device is tuned to a first channel, first data specific to the first channel or programs being supplied on the first channel, said first data being received in-band on the first channel which is also used to communicate first channel program content, said first data including at least one of control data, catalog data or channel data which specifically corresponds to the first channel;
   executing a first bound application while said customer premise device is tuned to said first channel, said first bound application corresponding to the first channel;
   tuning said customer premise device to a second channel used to communicate second program content;
   terminating the first bound application in response to said customer premise device tuning to said second channel,
   executing a second bound application while said customer premise device is tuned to said second channel, said second bound application corresponding to the second channel; and
   continuing to execute said unbound application using second data received in-band on said second channel in place of said first data previously received on said first channel, said second data being specific to the second channel or programs being supplied on the second channel, said second data including at least one of control data, catalog data or channel specific data which specifically corresponds to the second channel.

2. The method of claim 1, wherein said second data is channel specific catalog data corresponding to programs communicated on said second channel, said unbound application using the channel specific catalog data corresponding to the second channel in place of channel specific catalog data corresponding to the first channel.

3. The method of claim 1, wherein said unbound application continues to run and is not terminated when the customer premise device tunes from the first channel to the second channel.

4. The method of claim 1, wherein said unbound application provides program loopback functions with respect to programs to which the customer premise device is tuned at a given time.

5. The method of claim 1, wherein said first data is first catalog data including information identifying a program currently being broadcast or previously broadcast on said first channel and information which can be used to access portions of said program which have already been broadcast via said first channel.

6. The method of claim 1, wherein said first data is first catalog data including information identifying programs previously broadcast on said first channel and information that can be used to access the previously broadcast programs, said first catalog data being specific to said first channel and not including program data for said second channel.

7. The method of claim 6, wherein the previously broadcast programs are programs that were previously broadcast within a set time period.

8. The method of claim 7, wherein application data for the unbound application that is relevant and unique to a given channel to which the customer premise device is received via the given channel to which the customer premise device is tuned using in-band signaling.

9. The method of claim 5,
wherein said first data is received while a broadcast program is being received via said first channel and displayed; and
wherein said first data is used to support a video on demand (VOD) application using which a user can control streaming of stored content corresponding to a portion of said broadcast program which has previously been broadcast on said first channel.

10. The method of claim 9, wherein said (VOD) application supports at least one of a program StartOver function and a program LookBack function.

11. The method of claim 1,
wherein said first channel is a digital channel; and
wherein said first and second data is delivered using a private data section on the first digital channel.

12. The method of claim 1, wherein said unbound application is a usage data collection application, said first data being control data used to trigger sending of a response message to a server by any devices which receive said control data from said first channel, the method further comprising:
sending a response message to a server, said response message identifying the customer premise device responding to said control data.

13. The method of claim 1, wherein said unbound application is a usage data collection application, said first data being a control message used to trigger sending of a response message to a server by devices which receive said control message to allow the server to measure who and how many STBs are tuned to a given channel over which the control message is sent the method further comprising:
sending a response message to the server, said response message identifying the customer premise device responding to said control data.

14. The method of claim 1, wherein said unbound application uses, in addition to said first data received in-band, data obtained from an out of band channel, said out of band channel corresponding to a different frequency band than the frequency band to which the first channel corresponds.

15. The method of claim 1, wherein said unbound application supports incoming call notification functions including caller ID in addition to a StartOver function, said incoming call notification function using data received using an out of band channel, said StartOver function using catalog data obtained from a broadcast channel used to deliver program content to the customer premise device at the time the function is provided, said customer premise device being tuned to the broadcast channel at the time the function is provided.

16. The method of claim 1, wherein functionality provided by the unbound application varies depending on data obtained from a channel to which the customer premise device is tuned to.

17. The method of claim 16, wherein the unbound application provides a ticker information display function when the device is tuned to the first channel and a logo display function when tuned to a second channel, said first data being ticker data being supplied to said customer premise device via said first channel, and said second data being logo data being supplied to said customer premise device via the second channel.

18. A customer premise device, comprising:
an application execution module configured to execute an unbound application on said customer premise device, said unbound application using, while said customer premise device is tuned to a first channel, first data specific to the first channel or programs being supplied on the first channel, said first data being received in-band on the first channel which is also used to communicate first channel program content, said first data including at least one of control data, catalog data or channel specific data which specifically corresponds to the first channel;
wherein said application execution module is further configured to execute a first bound application while said customer premise device is tuned to said first channel, said first bound application corresponding to the first channel;
wherein the customer premise device further comprises a tuner control module configured to control a tuner in said customer premise device to tune to a second channel used to communicate program content;
wherein said application execution module is further configured to terminate the first bound application in response to said customer premise device tuning to said second channel, and execute a second bound application while said customer premise device is tuned to said second channel, said second bound application corresponding to the second channel; and
wherein said application execution module is further configured to continue to execute said unbound application using second data received in-band on said second channel in place of said first data previously received on said first channel, said second data being specific to the second channel or programs being supplied on the second channel, said second data including at least one of control data, catalog data or channel specific data which specifically corresponds to the second channel.

19. The customer premise device of claim 18, wherein said second data is channel specific catalog data corresponding to programs communicated on said second channel, said unbound application using the channel specific catalog data corresponding to the second channel in place of channel specific catalog data corresponding to the first channel.

20. The customer premise device of claim 18, wherein said unbound application supports incoming call notification functions including caller ID in addition to a StartOver function, said incoming call notification function using data received using an out of band channel, said StartOver function using catalog data obtained from a broadcast channel used to deliver program content to the customer premise device at the time the function is provided, said customer premise device being tuned to the broadcast channel at the time the function is provided.

* * * * *